United States Patent Office 3,272,716
Patented Sept. 13, 1966

3,272,716
MICROBIAL OXIDATION OF NAPHTHALENE TO SALICYLIC ACID IN THE PRESENCE OF AN ALUMINUM COMPOUND
Mayer B. Goren, Golden, Colo., and James E. Zajic and William J. Dunlap, Oklahoma City, Okla., assignors to Kerr-McGee Oil Industries, Inc., a corporation of Delaware
No Drawing. Filed Oct. 24, 1963, Ser. No. 318,499
15 Claims. (Cl. 195—51)

This invention relates to the preparation of salicylic acid and more particularly to an improved process for preparing salicylic acid by microbial oxidation of naphthalene.

Salicylic acid is a valuable substance of commerce. It is used extensively in the manufacture of methyl salicylate, acetylsalicylic acid and certain dyes. It also serves as an excellent preservative for food products and is useful for medicinal purposes as a bacteriostat or in the form of acetylsalicylic acid as an analgesic and an antirheumatic agent.

The production of salicylic acid from naphthalene by microbiological oxidation has attracted much interest in the industry due to the relative differences in value of the end product salicylic acid and the inexpensive and plentiful starting material naphthalene. While certain species of the genus Pseudomonas have been observed to oxidize naphthalene to salicylic acid, the yield of salicylic acid obtained heretofore has been unsatisfactory. There also is much variability in yield and the relative proportion of various intermediates vary widely. In many cultures the accumulation of salicylic acid in the fermentation medium is accompanied by a decrease in the viable cell population, and after a resultant lag phase, there is renewed growth of the bacterial population and a concomitant decrease in the yield of salicylic acid. In view of these problems of the prior art, the development of a dependable process permitting the accumulation of salicylic acid in fermentation media during oxidative fermentation of naphthalene has been the subject of much study. Nevertheless, most of the salicylic acid of commerce is produced at present from phenol by modifications of the Kolbe synthesis despite the numerous attempts over the years to produce salicylic acid in large amounts by biological oxidation of naphthalene.

It is an object of the present invention to provide an improved process for preparing salicylic acid by microbial oxidation of naphthalene.

It is a further object to provide an improved process for accumulating salicylic acid during the oxidative fermentation of naphthalene.

It is still a further object to increase the yield of salicylic acid produced by microbial oxidation of naphthalene.

Still other objects and advantages of the invention will been apparent to those skilled in the art from the following detailed description and the specific examples.

It has been discovered that an increased yield of salicylic acid may be recovered in the oxidative fermentation of naphthalene by incorporating a small amount of an aluminum compound with an aqueous nutrient medium employed in naphthalene formentation. Thus, in accordance with one important aspect of the present invention the microbiological oxidation of naphthalene is carried out in a fermentation medium containing an added aluminum compound.

An increased yield of salicylic acid may be obtained by incorporating small quantities of inorganic aluminum compounds, organic aluminum compounds or mixtures of inorganic and organic aluminum compounds with aqueous media normally employed in naphthalene fermentation. It has been found that the presence in fermentation media of small quantities such as for example 0.1–1% by weight, and preferably 0.2–0.6% by weight, of aluminum hydroxide, aluminum chloride, aluminum sulfate, aluminum oxide, aluminum borate, aluminum chromate, aluminum naphthenate, aluminum tartrate and aluminum lactate are effective to increase the yield of salicylic acid. Of these compounds, usually aluminum hydroxide is the most effective and is preferred. The beneficial effect of the aluminum compound on the yield of salicylic acid is general and it is not limited to any given species of microbes of the genus Pseudomonas used in the microbiological oxidation.

The microorganisms which may be employed in practicing the invention are species of Pseudomonas. Examples of species which are especially useful are *P. aeruginosa, P. oleovorans, P. stutzeri, P. rathonis and P. desmolyticum.* Pseudomonas rathonis and Pseudomonas oleovorans are usually preferred over other species of Pseudomonas.

A variety of inorganic compounds are known to be utilized by species of microorganisms of the genus Pseudomonas employed in practicing the present invention. It is understood that an aqueous nutrient medium or basal fermentation medium normally used in cultivating a specific species of microorganisms may be used in practicing the invention upon adding an aluminum compound described herein in an effective amount.

When employing species of Pseudomonas, the aqueous basal fermentation medium may contain the usual mineral salts which are normally used in the cultivation of these microbes. One aqueous basal fermentation medium which is very useful contains by weight based upon the weight or volume (1%=1 gm./100 ml.) of the fermentation medium, 0.2% sodium nitrate, 0.02% magnesium sulfate, 0.1% iron sulfate, 0.021% dibasic potassium phosphate, 0.009% monobasic potassium phosphate, 0.004% sodium chloride, 0.0015% calcium chloride, 0.5 microgram/100 ml. copper sulfate, 1.0 microgram/100 ml. boric acid, 1.0 microgram/100 ml. manganous sulfate, 7.0 micrograms/100 ml. zinc sulfate, and 1.0 microgram/100 ml. molybdic acid. The pH of the nutrient media may be adjusted to 7.4 by addition of base and the medium is sterilized in an autoclave at 15 lbs. pressure at a temperature of 121° C. for thirty minutes. If desired, the nutrient media may contain up to 1.5% by weight of mono and dibasic potassium phosphate and the high buffering capacity of the phosphate tends to neutralize the salicylic acid as it is formed and increase the apparent solubility of naphthalene. When high yields of salicylic acid are observed, it is often desirable to add 0.005–0.1% by weight of calcium carbonate. Nontoxic emulsifying agents such as 0.001–0.1% by weight of alkyl phenol or nonionic octylphenoxyethanol surfactants may be added to give stabilized emulsions and improve the apparent solubility of naphthalene. If it is desired to cultivate species of Pseudomonas on solid media, then about 2% by weight of agar may be added to the basal mineral salts fermentation medium.

The highly toxic nature of naphthalene to most microbes generally makes sterilization unnecessary. If desired the naphthalene and aluminum compound may be sterilized with the fermentation medium or added separately after sterilization of the fermentation medium. A nutrient medium such as described above may be provided with 0.5–4% by weight and preferably 1–1.5% by weight of naphthalene as a substrate, and 0.1–1% and preferably 0.2–0.6% by weight of an added aluminum compound. Preferably, the naphthalene is in a finely divided condition and for best results the aluminum compound also is in a finely divided condition when insoluble in the aqueous nutrient medium. The nutrient medium may be inoculated with a suitable amount of an inoculum, such as with a liquid inoculum in an amount of 0.2–10% and preferably 3% by volume of the nutrient media. The nutrient medium may be incubated at a temperature at which the microbes will grow and multiply rapidly such as 25–50° C. and preferably 30–35° C. For best results, the nutrient medium is agitated during the incubation period. The incubation may extend over any suitable period of time to biologically oxidize the naphthalene to salicylic acid such as 2–7 days and preferably 4–6 days, but the incubation period may vary considerably depending somewhat upon how rapidly the microbes multiply under the incubation conditions employed in a specific instance. When the incubation period has expired, the salicylic acid product may be recovered from the aqueous nutrient medium.

The fermentation step may be conducted in experimental laboratory equipment or large scale fermentors such as 100, 1,000 or 20,000 gallon fermentors. The chemical and physical conditions used in the larger fermentors may be related directly to those used in the experimental type vessels and in general no difficulty is encountered upon increasing the size of the fermentor.

In carrying out the fermentation on a laboratory scale, 100 ml. of fermentation medium as described above may be added to a 500 ml. Erlenmeyer flask and the contents inoculated with a suitable amount of liquid inoculum. Standard cotton tops and handling procedures may be utilized. Suitable amounts of the naphthalene and the aluminum compound may be added and the contents of the flask may be incubated with agitation.

It is understood that during the incubation period the fermentation medium should be maintained under conditions which are optimum for the multiplication and growth of the microbes. Factors which affect the multiplication and growth of microbes include temperature, agitation, and the initial pH of the nutrient medium. The temperature of incubators which may be employed is preferably 25–50° C. and for best results at 30–35° C. Shakers and other suitable apparatus may be utilized to provide agitation and aeration. It is also preferred that the initial pH of the nutrient media be 4–9 and preferably about 7.

The salicylic acid may be recovered from the fermentation medium after expiration of the incubation period by any of several known methods. For example, the fermentation reaction mixture may be acidified to a pH of about 3 and extracted with an organic solvent which is immiscible with water. Suitable solvents for the extraction include esters of lower fatty acids such as ethyl or butyl acetate, ethers, polychloroalkanes such as dichloromethane and chloroform. The polychloroalkanes are especially suitable as they selectively extract salicylic acid from aqueous solutions containing gentisic acid which is often present in the fermentation medium. The crude salicylic acid obtained by the extraction step may be recovered from the organic extractant by evaporation and crystallization from the solvent, and if desired may be further purified by sublimation or other suitable processes.

The foregoing detailed description and the following specific examples are for purposes of illustration only, and are not intended as being limiting to the spirit or scope of the appended claims.

EXAMPLE I

This example illustrates the increased yields of salicylic acid obtained upon addition of aluminum hydroxide to an aqueous basal fermentation medium containing 1.0% by weight of finely divided naphthalene and inoculated with *Pseudomonas rathonis*.

In this example, varying amounts of aluminum hydroxide were added to the basal fermentation media in a series of flasks. The basal medium in each flask contained 1.0% by weight of finely divided naphthalene and was inoculated with equal amounts of *Pseudomonas rathonis*. The flasks were shaken and incubated for six days, and then the contents of the flasks were assayed for salicylic acid. It may be observed from the data in Table I below that increased amounts of salicylic acid were obtained with levels of added finely divided aluminum hydroxide varying from 0.1 to 1.0% by weight as compared with the control test in which no aluminum hydroxide was added.

*Table I*

| Percent Al(OH)$_3$ | Mg. of salicylic acid in 100 ml. of fermentation broth |
| --- | --- |
| 0 | 0.1 |
| 0.1 | 24.5 |
| 0.2 | 45.9 |
| 0.3 | 83.0 |
| 0.4 | 75.7 |
| 0.5 | 78.4 |
| 0.6 | 83.0 |
| 0.8 | 49.0 |
| 1.0 | 37.7 |

EXAMPLE II

This example illustrates that the effect of Al(OH)$_3$ on the process of the invention is general and it is not restricted to a given species of microorganism. In this example, various microorganisms were inoculated into aqueous basal fermentation media into which either 0.0 or 0.4% by weight of finely divided Al(OH)$_3$ had been added. The flasks were incubated and assayed as in Example I. The data shown in Table II illustrates that the action of Al(OH)$_3$ in increasing the yield of salicylic acid is general.

| Culture | Mg. of salicylic acid in 100 ml. of fermentation broth | |
| --- | --- | --- |
| | 0.0% Al(OH)$_3$ | 0.4% Al(OH)$_3$ |
| Pseudomonas oleovorans | 1.2 | 70.0 |
| Pseudomonas stutzeri | 6.1 | 17.0 |
| Pseudomonas rathonis | 2.4 | 90.0 |
| Pseudomonas aeruginosa | 10.4 | 25.4 |

EXAMPLE III

This example illustrates the optimal fermentation time for the process. As may be seen from the data in Table III, the highest level was achieved after five days. In this example flasks containing an aqueous basal mineral salts fermentation medium, 1.0% by weight of finely divided naphthalene, and 0.4% by weight of finely divided Al(OH)$_3$ were inoculated with *Pseudomonas rathonis*. Every 24 hours for 7 consecutive days a sample of fermentation broth was taken and analyzed for salicylic acid. Salicylic acid formation started almost immediately, and the highest yields of 102 and 101 mg./100 ml. broth were observed in 5 and 6 days, respectively. After 6 days there appears to be a decrease or re-utilization of the salicylic acid as at 7 days the apparent yield had decreased to 50.5 mg./100 ml.

Table III

| Days: | Mg. of salicylic acid in 100 ml. of fermentation broth |
|---|---|
| 0 | 0.0 |
| 1 | 11.8 |
| 2 | 19.3 |
| 3 | 21.6 |
| 4 | 19.0 |
| 5 | 102.0 |
| 6 | 101.0 |
| 7 | 50.5 |

EXAMPLE IV

This example illustrates the range of the initial pH of fermentation media which is suitable for giving high yields of salicylic acid. The initial pH is important in determining yields of most fermentative products, and particularly so in the case of products which are extremely acid. In this example flasks with aqueous basal mineral salts fermentation media containing 1.0% by weight of finely divided naphthalene and 0.4% by weight of finely divided $Al(OH)_3$ were adjusted to various initial pH values and inoculated with *Pseudomonas rathonis*. As may be seen from the data in Table IV, the optimal initial pH of the media is about 7.0.

Table IV

| Initial pH (0 days) | Terminal pH (6 days) | Mg. of salicylic acid in 100 ml. of fermentation broth |
|---|---|---|
| 4.0 | 3.4 | 11.0 |
| 5.0 | 3.6 | 19.0 |
| 6.0 | 3.8 | 67.4 |
| 7.0 | 3.9 | 89.0 |
| 8.0 | 3.8 | 58.7 |
| 9.0 | 7.3 | 11.9 |

EXAMPLE V

This example illustrates the optimal level of naphthalene which should be added to the aqueous basal mineral salts fermentation media for best yields of salicylic acid. In this example, varying levels by weight of finely divided naphthalene were added to the basal media in two series of fermentation flasks, one of which contained no added $Al(OH)_3$, and the other of which contained 0.4% by weight of added finely divided $Al(OH)_3$. The flasks were inoculated with *Pseudomonas rathonis*, incubated for 6 days, and assayed for salicylic acid. The results are tabulated in Table V.

Table V

| Percent of weight of napthalene | Mg. of salicylic acid in 100 ml. of fermentation broth | |
|---|---|---|
| | 0.0% $Al(OH)_3$ | 0.4% by weight of $Al(OH)_3$ |
| 0.5 | 2.8 | 4.0 |
| 1.0 | 9.5 | 73.3 |
| 1.5 | 32.0 | 94.0 |
| 2.0 | 20.0 | 53.0 |
| 2.5 | 9.6 | 83.8 |
| 3.0 | 3.5 | 3.0 |
| 3.5 | 3.5 | 5.0 |
| 4.0 | 4.5 | 5.0 |

EXAMPLE VI

This example illustrates that both organic and inorganic compounds of aluminum have the ability to increase the yields of salicylic acid in a naphthalene fermentation. In this example, various levels of aluminum compounds were added to the aqueous basal mineral salts fermentation media containing 1.0% by weight of finely divided naphthalene and the media then inoculated with *Pseudomonas rathonis* and assayed at the end of six days. The ability of aluminum compounds in general to increase the yield of salicylic acid is illustrated by the data shown in Table VI.

Table VI

| Aluminum Compound | Percent by weight | Mg. of salicylic acid in 100 ml. of fermentation broth |
|---|---|---|
| Control | 0.0 | 0.6 |
| $AlCl_3$ | 0.2 | 6.6 |
| | 0.4 | 5.5 |
| | 0.6 | 1.8 |
| | 0.8 | 3.0 |
| | 1.0 | 10.5 |
| $Al_2(SO_4)_3$ | 0.2 | 4.9 |
| | 0.4 | 1.8 |
| | 0.6 | 6.2 |
| | 0.8 | 2.2 |
| | 1.0 | 3.6 |
| $Al_2O_3$ | 0.2 | 30.0 |
| | 0.4 | 3.5 |
| | 0.6 | 12.0 |
| | 0.8 | 5.5 |
| | 1.0 | 8.5 |
| $AlBO_3$ | 0.2 | 2.2 |
| | 0.4 | 1.0 |
| | 0.6 | 23.5 |
| | 0.8 | 17.0 |
| | 1.0 | 19.0 |
| Aluminum chromate | 0.2 | 24.0 |
| | 0.4 | 28.5 |
| | 0.6 | 29.5 |
| | 0.8 | 18.3 |
| | 1.0 | 15.2 |
| Aluminum naphthenate | 0.2 | 18.5 |
| | 0.4 | 24.0 |
| | 0.6 | 26.5 |
| | 0.8 | 29.0 |
| | 1.0 | 36.5 |
| Aluminum tartrate | 0.2 | 0.0 |
| | 0.4 | 8.5 |
| | 0.6 | 2.3 |
| | 0.8 | 3.7 |
| | 1.0 | 1.8 |
| Aluminum lactate | 0.2 | 3.0 |
| | 0.4 | 16.3 |
| | 0.6 | 4.3 |
| | 0.8 | 6.5 |
| | 1.0 | 1.8 |

What is claimed is:

1. A process for preparing salicylic acid comprising cultivating a microorganism capable of oxidizing naphthalene to salicylic acid of the genus Pseudomonas in an aqueous nutrient medium containing naphthalene and an added aluminum compound to thereby microbiologically oxidize the naphthalene to salicylic acid.

2. A process for preparing salicylic acid comprising cultivating *Pseudomonas rathonis* in an aqueous nutrient medium containing naphthalene and an added aluminum compound to thereby microbiologically oxidize the naphthalene to salicylic acid.

3. A process for preparing salicylic acid comprising cultivating *Pseudomonas oleovorans* in an aqueous nutrient medium containing naphthalene and an added aluminum compound to thereby microbiologically oxidize the naphthalene to salicylic acid.

4. A process for preparing salicylic acid comprising cultivating a microorganism capable of oxidizing naphthalene to salicylic acid of the genus Pseudomonas in an aqueous nutrient medium containing naphthalene and added aluminum hydroxide to thereby microbiologically oxidize the naphthalene to salicylic acid.

5. A process for preparing salicylic acid comprising cultivating a microorganism capable of oxidizing naphthalene to salicylic acid of the genus Pseudomonas in an aqueous nutrient medium containing naphthalene and about 0.1–1% by weight of an added aluminum compound to thereby microbiologically oxidize the naphthalene to salicylic acid.

6. A process for preparing salicylic acid comprising cultivating a microorganism capable of oxidizing naphthalene to salicylic acid of the genus Pseudomonas in an aqueous nutrient medium containing naphthalene and about 0.1–1% by weight of aluminum hydroxide to thereby microbiologically oxidize the naphthalene to salicylic acid.

7. A process for preparing salicylic acid comprising cultivating a microorganism capable of oxidizing naphthalene to salicylic acid of the genus Pseudomonas in an aqueous nutrient medium containing about 0.5–4% by weight of naphthalene and about 0.1–1% by weight of an added aluminum compound to thereby microbiologically oxidize the naphthalene to salicylic acid.

8. The process of claim 7 wherein the naphthalene is present in an amount of about 1.0–1.5% by weight.

9. The process of claim 7 wherein the aluminum compound is aluminum hydroxide.

10. The process of claim 7 wherein the aqueous nutrient medium is maintained at a temperature of about 25–50° C.

11. A process for preparing salicylic acid comprising the steps of forming an aqueous nutrient medium for microorganisms capable of oxidizing naphthalene to salicylic acid of the genus Pseudomonas containing basal mineral salts, 0.5–4% by weight of finely divided naphthalene and 0.1–1% by weight of an aluminum compound, inoculating the nutrient medium with an inoculum containing a microorganism capable of oxidizing naphthalene to salicylic acid of the genus Pseudomonas, the inoculated nutrient medium having an initial pH value of about 4–9, incubating the inoculated nutrient medium at a temperature of about 25–50° C. for a period of about 2–7 days and then recovering salicylic acid from the nutrient medium.

12. The process of claim 11 wherein the nutrient medium is inoculated with about 0.2–10% by volume of a liquid inoculum containing a microorganism of the genus Pseudomonas and the inoculated nutrient medium is agitated during the incubation step.

13. The process of claim 11 wherein the aluminum compound is aluminum hydroxide.

14. The process of claim 13 wherein the nutrient medium is incubated at a temperature of about 30–35° C. for a period of about 4–6 days.

15. The process of claim 14 wherein the inoculated nutrient medium has an initial pH value of about 7.

References Cited by the Examiner

UNITED STATES PATENTS 3,183,169   5/1965   Brilland _____ 195—28

OTHER REFERENCES

Klausmeier et al.: Journal of Bacteriology, vol. 73, January–June 1957, pp. 461–464.

A. LOUIS MONACELL, *Primary Examiner.*

D. M. STEPHENS, *Assistant Examiner.*